United States Patent [19]

Kuypers

[11] Patent Number: 4,557,308

[45] Date of Patent: Dec. 10, 1985

[54] TIRE VALVE AND LOW PRESSURE INDICATOR

[75] Inventor: Harold A. Kuypers, Nashville, Tenn.

[73] Assignee: Scovil Inc., Waterbury, Conn.

[21] Appl. No.: 621,713

[22] Filed: Jun. 18, 1984

Related U.S. Application Data

[63] Continuation-in-part of Ser. No. 458,257, Jan. 17, 1983, abandoned.

[51] Int. Cl.[4] .............................................. B60C 23/10
[52] U.S. Cl. ..................................... 152/427; 137/228; 137/517; 137/484.4; 73/146.8; 116/34 R
[58] Field of Search ............... 137/223, 227, 228, 229, 137/484.4, 517, 493.9, 498, 480; 73/146.8; 16/34 R, 28 A; 152/427, 415, 429, DIG. 11

[56] References Cited

U.S. PATENT DOCUMENTS

| 2,469,505 | 5/1949 | Keefer | 137/517 |
| 3,198,208 | 8/1965 | Tramontini | 137/517 X |
| 3,646,925 | 3/1972 | Eshelman | 137/480 X |
| 3,827,393 | 8/1974 | Winther | 73/146.8 X |
| 4,176,681 | 12/1979 | Mackal | 137/223 X |

FOREIGN PATENT DOCUMENTS

| 1174800 | 3/1959 | France | 137/517 |
| 2905009 | 12/1980 | Netherlands | 137/498 |

Primary Examiner—Harold W. Weakley
Attorney, Agent, or Firm—Dallett Hoopes

[57] ABSTRACT

Flexible check-valve-like baffle is provided in low pressure indicator to assure proper seating of poppet and maximum flow during fill.

12 Claims, 7 Drawing Figures

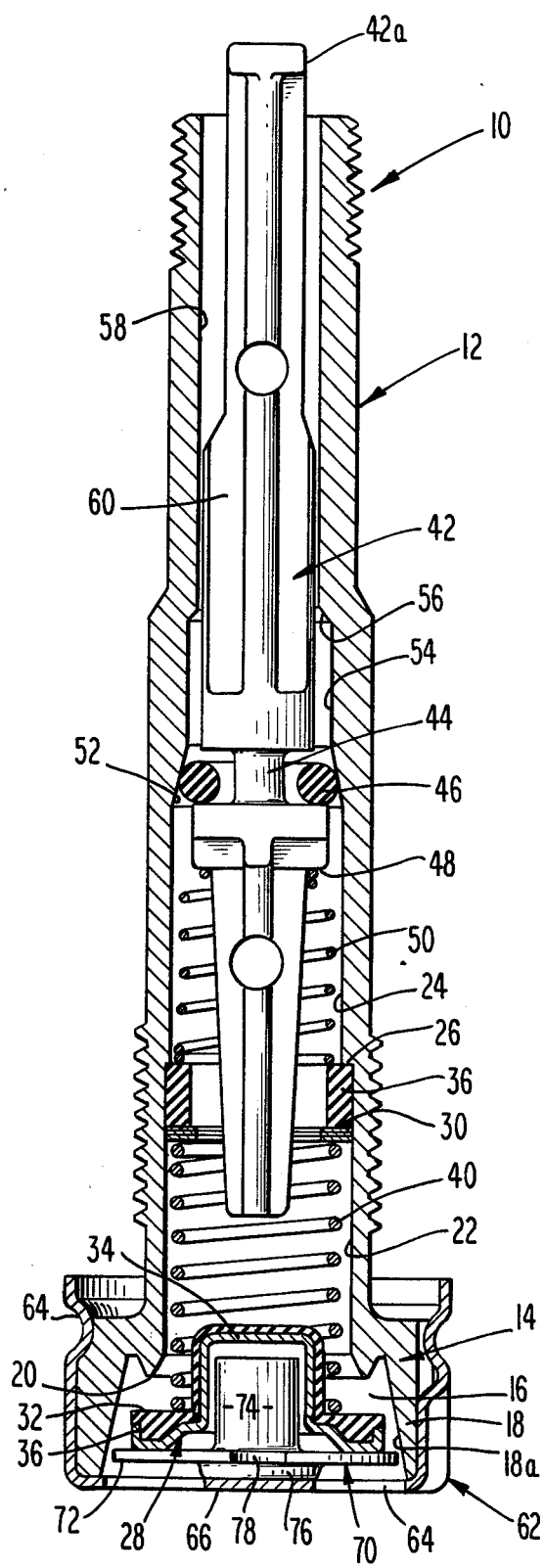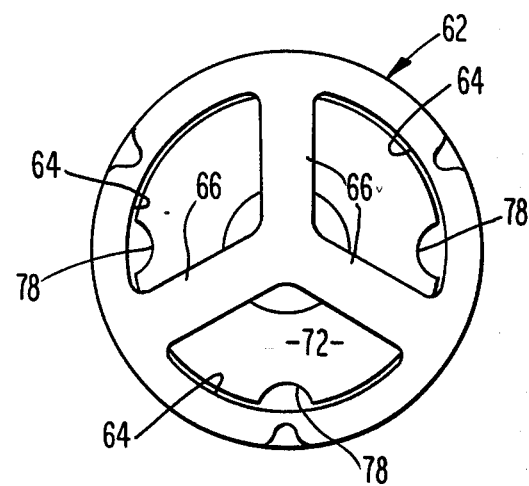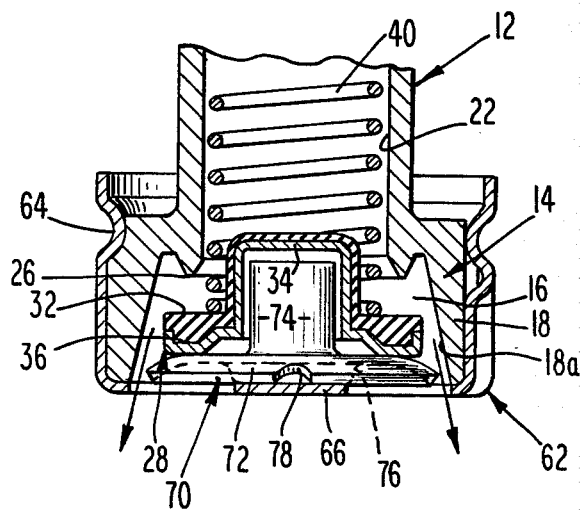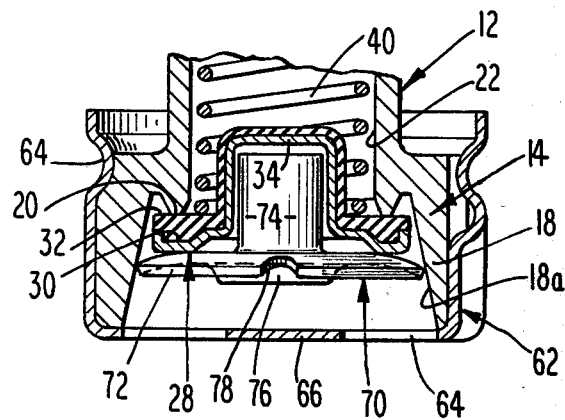
Fig. 1
Fig. 2
Fig. 3
Fig. 4

TIRE VALVE AND LOW PRESSURE INDICATOR

CROSS REFERENCE TO RELATED APPLICATION

This application is a continuation in part of my earlier application Ser. No. 458,257 filed Jan. 17, 1983, now abandoned.

BACKGROUND OF THE INVENTION

1. Field of the Invention

This invention relates to a tire valve and low pressure indicator. More specifically, this invention relates to an integral tire valve and low pressure indicator of the type disclosed and claimed in the application of Harry C. Winther, U.S. Ser. No. 182,606 filed Aug. 29, 1980, now abandoned.

The earlier valve and indicator comprises a tubular body adapted to be mounted in a rim-hole opening in an automobile wheel, for instance. The end of the body inside the tire is formed with a seat, and a valve poppet engages against the seat. A spring within the tubular body urges the poppet away from the seat and an indicator piston is disposed in the tubular body above the poppet. When the tire pressure falls, the spring overcomes the pressure within the tire and drives the poppet open permitting air from the tire to enter the tubular body and force the indicator piston into signalling position. The unit is more thoroughly disclosed, of course, in the aforementioned application. A special advantage of the unit is that the indicator feature does not interfere with the normal functions of gauging, filling and venting characteristic of the normal tire valve.

The present invention enhances the reliability of the Winther-type tire valve and low pressure indicator.

2. Description of the Prior Art

The closest prior art of the present invention is the aforementioned Winther tire valve and low pressure indicator.

Aside from the Winther device the patent art discloses a number of "add-on" indicators adapted to be threaded on to a standard tire valve and a number of elaborate signalling means, some of which involve signals on the dashboard within the vehicle. It will suffice to note that Winther is by far the most pertinent art.

While the valve of the aforementioned application is in every way meritorious, one of the design mandates for its proper functioning is that the wall surrounding the poppet be very close to assure the proper piston action of the air in the tire against the poppet once the filling chuck is removed after filling. Such piston action is necessary to effect the seating of the poppet. Without seating, the valve is non-functional. This design mandate is in practice translated into a manufacturing requirement that is onerous in terms of strict adherence to very close predetermined tolerances with consequent expense in the form of time taken in constant dimension checking and in the form of excessive rejection of product.

SUMMARY OF THE INVENTION

Under the present invention, the close lateral dimension requirement of the poppet and its surrounding wall is made unnecessary, yet the adequate piston action of the tire air is maintained to assure proper resting of the poppet after the fill chuck is removed.

Under the present invention, an extremely simple structure is presented as an improvement to the Winther valve. This improvement serves to enhance the reliability of the valve:

1. It assures the proper seating of the valve after the filling of the tire.
2. It automatically effects the scouring of the valve seat and adjacent area by the incoming air thereby avoiding seat leakage.

It also permits increased flow of air when mounting a tire so that the tire bead can be more easily set, in less time.

The invention involves the provision of a flexible baffle of generally disc shape disposed adjacent to the poppet and adapted to cooperate with a skirt surrounding the seat.

BRIEF DESCRIPTION OF THE DRAWINGS

Further features and objects of the invention will be apparent from reference to the following specification, including drawings, all of which disclose non-limiting embodiments of the invention. In the drawings:

FIG. 1 is a sectional view of a valve and low pressure indicator embodying the invention;

FIG. 2 is a bottom plan view;

FIG. 3 is a fragmentary sectional view of the lower end showing the valve in filling mode; and FIG. 4 is a fragmentary sectional view of the lower end showing the valve with the poppet in closed position.

DESCRIPTION OF THE PREFERRED EMBODIMENT

Figure 5:
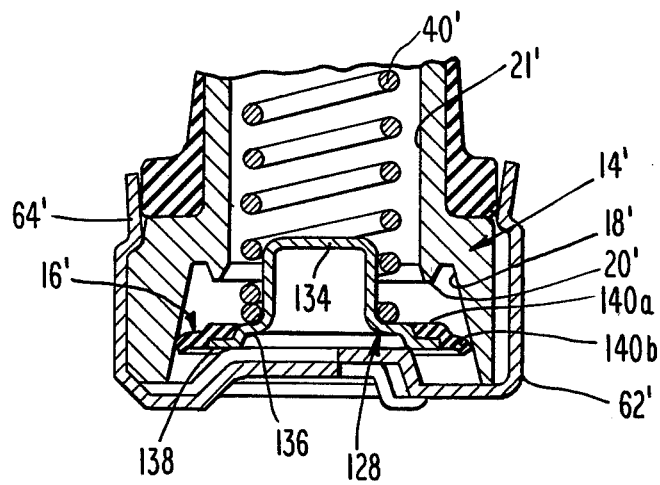
FIG. 5 is a view similar to FIG. 4 but showing a modified version of the poppet having an integral flapper element shown in the prior-to-installation condition.

A tire valve and low pressure indicator embodying the invention is shown in FIG. 1 and generally designated 10. It comprises a tubular body 12 having an enlargement 14 at its lower end, and having a downwardly facing circular recess 16 defined by the depending skirt 18.

Inward of the skirt 18 the body is formed with a valve seat 20 disposed at the lower end of a bore 22. The bore 22 abruptly reduces in diameter to an intermediate section 24, the reduction forming an annular shoulder 26.

A cup-shaped valve poppet 28 is provided within the skirt 18 and is formed with an annular trough 30 in which is secured a gasket 32 adapted to engage sealingly the seat 20. The poppet is formed with a central inverted cup 34.

A spacing washer 36 of hard unyielding plastic such as high density polyethylene is disposed up against the shoulder 26 and appropriate metal shims 38 are disposed under the washer. In compression positioned between the poppet and the shims is the spring 40. The spring as shown urges the poppet away from the seat 20. However, in use, pressure within the tire working against the underside of the poppet drives it up to seating position, overwhelming the force of the spring 40.

Disposed within the tubular body above the poppet is the indicating piston 42. The poppet is formed with a neck 44 in which is disposed an O-ring 46. Beneath the neck 44 the piston is formed with a downwardly facing annular shelf 48. A light second compression spring 50 is disposed between shelf 48 and the upper surface of the washer 36 holding the piston up in essentially the position shown.

As further disclosed, in FIG. 1 the hole through the body is tapered at zone 52 above the section 24 and this tapered zone 52 leads to a narrower bore 54 which terminates upwardly in an annular O-ring seat 56 which surrounds and upwardly extends a uniform passage 58 to the upper end of the body.

It will be understood that to permit maximum air flow, the piston is formed with an X-shaped cross section in the area 60.

The lower end of the valve and low pressure indicator is provided with a cup-shaped retainer 62 (FIG. 2) which is crimped as at 64 to the enlarged lower end of the valve. The retainer is formed in its bottom wall with three pie-sliced shaped windows 64 leaving the radial retaining webs 66 to hold in the poppet.

As explained in the aforementioned application, the operation of the valve is quite simple. When the tire is under full pressure, such pressure holds the poppet against the seat 20. When the pressure drops, the spring 40 overwhelms the force of the pressure on the bottom side of the poppet and forces the poppet open permitting air to enter the valve from the tire. This inward flowing air works upward against the downwardly facing surfaces of the indicator piston 42 and O-ring 46 to drive them both upwardly until the O-ring sits on the seat 56 sealing the valve from loss of air. The upper end 42a of the indicating piston that extends up is readily visible to signal the loss of pressure.

The indicating function of the valve does not interfere with normal gauging, filling and venting functions. Thus, filling may be accomplished by placing the filling chuck over the threaded upper end of the valve and the activating button on the chuck will be depressed by the upper end of the piston 42 which bottoms on the poppet. In deflating, with the poppet on its seat, the indicating piston may be depressed until it bottoms on the inverted cup in the center of the poppet and opens the poppet. Similarly, in gauging, the gauge can be placed over the threaded upper end of the valve, its tongue depressing the piston 42 to crack open the poppet as described.

Attention is now directed to the specific improvement to which the present invention relates.

Referring to the lower end of the valve shown in FIG. 1, a disc-like baffle 70 is disposed intermediate the poppet 28 and the retainer 62. It is preferably unitary and molded from a flexible material such as neoprene. It comprises a relatively thin disc 72 formed with a central upper boss 74 loosely disposed within the inverted cup 34 and the poppet. It also includes a central downward spacing projection 76. The periphery of the disc 72 is notched as at 78 (FIG. 2) and is proximate wall 18a. "Proximate" herein is meant to include engaging.

It will be understood that in all positions of the poppet, the boss 74 of the baffle in cooperation with cup 34 centralizes the baffle in the recess 16.

The operation of the valve baffle will now be explained. With the valve mounted in the wheel and the valve parts as shown in FIG. 1, the tire is inflated by placing a filling chuck over the threaded upper end of the valve. During filling air rushes down the inside of the valve past the outside of O-ring 46, through the seat 26 and about the periphery of the poppet 28, (FIG. 3). The baffle 70 flexes downwardly (FIG. 3) to permit the maximum flow of incoming air through the valve (see arrows). This permits the highest flow of air, scouring off the seat 26 and driving into the tire and away from the seat any foreign particles so as not to interfere with the proper subsequent seating of the poppet.

After the tire is filled to proper pressure, the filling chuck is removed from the upper end of the valve and pressure immediately drops in the upper part of the valve causing a pressure differential across the O-ring 46 and driving the indicator piston upward so that the O-ring 46 seats on seat 56. Simultaneously, because there is a consequent pressure drop in the inside of the valve below O-ring 46, there is a pressure drop across the poppet 28 and baffle 70 so that the higher pressure in the tire chamber drives the poppet and baffle upward to the position shown in FIG. 4.

The presence of the baffle 70 combined with the tapered wall 18a with which the periphery of the baffle cooperates assures that there will be adequate upward forcing action of the air to assure proper seating of the poppet on seat 20. More specifically, the baffle, extending out to proximate the wall 18a (FIG. 1.) in the open poppet position reduces the flow area between the poppet and the wall and causes a larger pressure differential across the poppet and baffle than there would be if there were no baffle. This results in greater early closing force as the poppet starts to move up and assures good seating. It makes the poppet operable at relatively low tire pressures.

At the end of the filling operation, the poppet and baffle assume the position shown in FIG. 4. The attendant then manually presses down the top 42a of the indicator piston 42 so that it assumes the non-indicating position shown in FIG. 1.

Should the air pressure in the tire subsequently drop below the indicating pressure for which the valve is designed the air pressure is insufficient to hold the poppet up in the position shown in FIG. 4 against the spring 40. Spring 40 drives the poppet and baffle down to the FIG. 1 position. This, of course, permits air to pass upward through seat 20 driving the indicator upward until the O-ring 46 rests on seat 56. The upper end of the indicator piston 42 will then be visible through the transparent plastic cap (not shown) screwed on to the upper end of the valve.

During the gauging or deflating operation, the indicator piston is pressed downwardly either by the gauge depressor or some other tool and the lower end of the piston abuts the top of cup 34 and drives it downward to unseat it from seat 20. Air passes from the tire chamber through the notches 78 of the baffle 70 and up into the tire valve body to permit the desired gauging or venting. Thus the baffle 70 does not interfere with the flow of air from the tire chamber through seat 20.

MODIFIED EMBODIMENT

Figure 6:
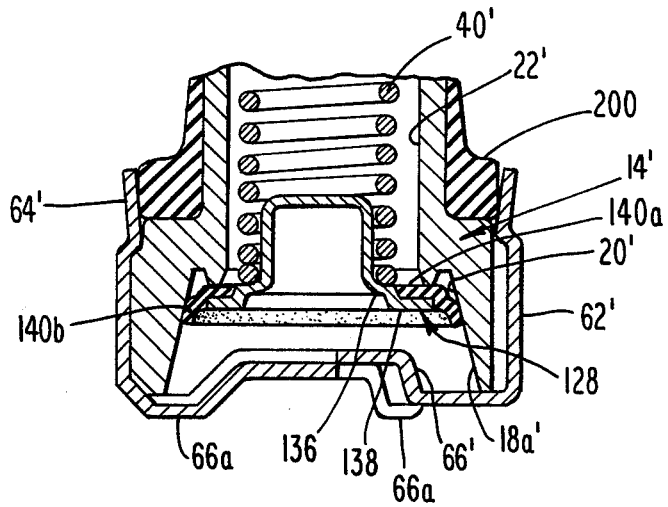
FIG. 6 is the sectional view similar to FIG. 5 but showing the poppet in closed condition.
Figure 7:
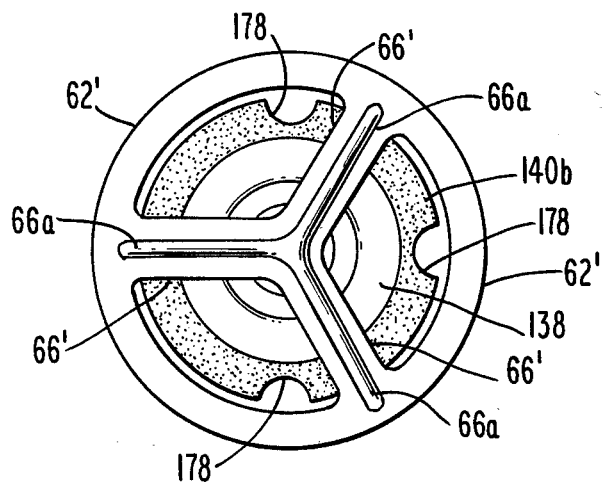
FIG. 7 is a bottom plan view of the modified embodiment of the invention as shown in FIGS. 5 and 6.

The modified embodiment of the invention is shown in FIGS. 5, 6 and 7. The upper portion of the modified embodiment is the same as the earlier-described embodiment. In the modified form, the primed form of reference numerals in the FIG. 1 embodiment is used to designate corresponding parts. In the area of the poppet and baffle means, new numbers are used.

The retainer 62' is formed with three spokes 66' which may be ribbed as shown at FIG. 66a for strengthening which hold the poppet 128 in the compartment 16' preferably a central portion of the retainer is stepped inward of the end of the skirt 18' to limit the travel of the poppet. The poppet 128 is formed with an upward central inverted cup 134 with an outward shelf 136, a downward step and then an outward annular foot 138. Bonded to the top of the foot is an annular piece of rubber or the like 140 which includes an upper layer 140a which forms the mating seal for the seat 20' when the poppet is closed (FIG. 6). Extending outward and preferably unitary with the seal 140a is the baffle portion 140b which is notched as at 178 which notches meter the air flow back through the valve to the outside to assure proper functioning of the valve as described. The flexible baffle portion 140b of the modified embodiment flexes in filling (not shown) to permit the rush of incoming air.

A gasket 200 may be provided above the base 14' to sealingly engage the metal of the tire rim about the rim hole opening.

The operation of the modified embodiment of the invention is very similar to the preferred embodiment. The simpler structure and reduction of parts, however, will be noted.

It will thus be seen that for all the advantages of the improved embodiments, the usual functions that a tire valve has, inflatability, deflatability and gaugeability, are not impeded. The advantages of the improvement comprising the addition of baffle means lie primarily in the assurance of the proper seating of the valve, the cleaning action on the valve seat during filling, and the increased air flow to permit proper setting of the tire bead during tire mounting.

It should be noted that the parts of the lower portions of the valve—that is, the lower body, including the tapered wall 18a, the poppet, the baffle and the retainer—are useful in themselves as a low-pressure-activated venting valve.

While the invention has been disclosed in a limited number of forms, it is contemplated that it can take many forms of various configurations and arrangements all falling within the scope of the appended claim language and equivalents thereof.

I claim:

1. In a tire valve and low pressure indicator having a tubular body adapted to be mounted in the rim hole opening of a vehicle wheel and having a seat disposed inward of the rim in the tire chamber, a poppet seating on the seat and a spring in the tubular body compressively disposed against the poppet and urging it off its seat and indicator means disposed in the tubular body and adapted upon the unseating of the poppet to be driven by the air coming into the tubular body away from the seat to a signal position; the improvement of the tubular body having an annular projecting skirt outward from the seat, circular flexible baffle means carried by the poppet and extending outward therefrom, the periphery of the baffle means being proximate to the wall of the skirt when the poppet is open, the baffle means flexing outward as air is admitted past the seat into the tire chamber to permit increased flow between the baffle means and the wall, but limiting such flow in the opposite direction to assure a proper seating of the poppet by the pressure of air in the tire chamber, the poppet having a central recess and the baffle means having a central projection disposed in the recess whereby the baffle means is generally centered with respect to the poppet.

2. A tire valve and low pressure indicator as claimed in claim 1 wherein the baffle means has notch means in its periphery to pass air in the outward direction.

3. A tire valve and low pressure indicator as claimed in claim 1 wherein a retainer extends across the distal end of the wall and the baffle means has a central bump on its outer surface to space the periphery of the baffle means away from the retainer.

4. A tire valve and low pressure indicator as claimed in claim 1 wherein the inside surface of the wall is tapered increasing in diameter away from the seat.

5. A valve and low-pressure indicator assembly for a pressurized container comprising:
(a) a tubular housing having a downwardly facing seat disposed in the container and downward annular skirt surrounding the seat having an inside wall with an outward taper away from the seat;
(b) a valve poppet cooperating with the seat, and comprising a rigid hat-shaped element having a flat, flexible elastomeric layer secured to the top of the brim of the rigid hat-shaped element to comprise a valve surface and extending outward beyond the brim to comprise a flexible annular baffle;
(c) spring means biasing the valve poppet away from the seat, the spring means being overcomeable by air pressure within the container to close the poppet above a pre-established pressure; and
(d) an indicator piston receiprocable in the housing and having an upper portion adapted to be seen and indicate low pressure, whereby the baffle assists in the closing action of the poppet and normally engages the tapered wall.

6. A valve and low pressure indicator as claimed in claim 5 wherein the baffle means is formed with at least one notch in its periphery.

7. A valve and low pressure indicator as claimed in claim 5 wherein a poppet-and-baffle-means-retainer is disposed across the skirt.

8. A low-pressure-activated indicating valve having a tubular body adapted to be mounted in a container wall and having a seat disposed facing inward of the container, a poppet having a seal seating on the seat and a spring in the tubular body compressively disposed against the poppet and urging it off its seat, the tubular body having an annular projecting skirt outward from the seat, outwardly extending generally circular flexible baffle means carried by the poppet, the periphery of the baffle means extending outward beyond the diameter of the seat, the poppet having a central recess and the baffle means having a central projection disposed in the recess whereby the baffle means is generally centered with respect to the poppet, the baffle means flexing outward as air is admitted past the seat into the container to permit increased flow between the baffle means and the skirt, but limiting such flow in the opposite direction to assure a proper seating of the poppet by the pressure of air in the tire chamber.

9. A valve as claimed in claim 8 wherein the skirt has a tapered interior wall increasing in diameter away from the seat.

10. A valve as claimed in claim 8 wherein the baffle means has notch means in its periphery to pass air in the outward direction.

11. A valve as claimed in claim 8 wherein a retainer extends across the distal end of the skirt.

12. A valve as claimed in claim 11 wherein a central portion of the retainer is set inward from the end of the skirt.

* * * * *